United States Patent
Zhurin et al.

(10) Patent No.: US 6,936,230 B2
(45) Date of Patent: Aug. 30, 2005

(54) SYSTEM FOR THERMAL AND CATALYTIC CRACKING OF CRUDE OIL

(75) Inventors: Viacheslav V. Zhurin, 548 Charrington Ct., Ft. Collins, CO (US) 80525; Victor B. Tikhonov, Moscow (RU)

(73) Assignee: Viacheslav V. Zhurin, Ft. Collins, CO (US)

( * ) Notice: Subject to any disclaimer, the term of this patent is extended or adjusted under 35 U.S.C. 154(b) by 931 days.

(21) Appl. No.: 09/746,337

(22) Filed: Dec. 20, 2000

(65) Prior Publication Data

US 2001/0046460 A1 Nov. 29, 2001

Related U.S. Application Data (60) Provisional application No. 60/174,687, filed on Jan. 6, 2000.

(51) Int. Cl.⁷ .............................................. C10G 51/04
(52) U.S. Cl. ........................ 422/188; 422/198; 422/211
(58) Field of Search ................................ 422/188, 198, 422/211; 208/67; 196/98

(56) References Cited

U.S. PATENT DOCUMENTS

| | | | |
|---|---|---|---|
| 2,816,658 A | * 12/1957 | Braun et al. ................. | 209/732 |
| 3,613,887 A | 10/1971 | Wikdahl | |
| 3,789,513 A | * 2/1974 | Mark .......................... | 34/368 |
| 3,815,327 A | * 6/1974 | Viland ........................ | 95/220 |
| 4,019,883 A | * 4/1977 | Klomp ........................ | 96/377 |
| 4,428,839 A | 1/1984 | Davies et al. | |
| 4,581,142 A | * 4/1986 | Fladby et al. ............. | 210/512.1 |
| 4,710,299 A | * 12/1987 | Prendergast ............. | 210/512.1 |
| 5,032,275 A | 7/1991 | Thew | |
| 5,061,457 A | 10/1991 | Hsieh et al. | |
| 5,071,556 A | 12/1991 | Kalnins | |
| 5,108,608 A | * 4/1992 | Carroll .................... | 210/512.1 |
| 5,318,691 A | 6/1994 | Muldowney | |
| 5,819,955 A | * 10/1998 | Clarke ........................ | 209/732 |
| 6,238,579 B1 | 5/2001 | Paxton | |
| 6,790,251 B1 | * 9/2004 | Brady, Jr. ................... | 55/419 |

FOREIGN PATENT DOCUMENTS

| | | |
|---|---|---|
| DE | 1000551 | 2/1960 |
| GB | 2249502 | 5/1992 |

OTHER PUBLICATIONS

D.F. Kelsall, "The Theory and Applications of the Hydrocyclone", 1968, Chemical Publishing CO. Inc., New York, pp. 68–89.

L. Svarovsky, "Hydrocyclones", 2000, Butterworth–Heineman, Oxford, pp. 191–220.

L.D. Landau, E.M. Lifshits, Theoretical Physics, v. VI, Hydrodynamics, Russian Publishing House "Nauka", Publishing House of Physical –Mathematical Literature, Moscow, 1986,p. 364et sc.

N.E. Zhukovsky, "Collection of N.E. Zhukovsky Works". v.7, All–Union Scientific–Technical Publishing, Moscow, 1937,p. 364–390.

* cited by examiner

*Primary Examiner*—Jonathan Johnson (57) ABSTRACT

In this invention the system and processes for organization of oil refinery from gases and heavy admixtures with a separation of purified oil for fractions obtained in the process of thermal distillation, and thermal and catalytic cracking and subsequent fine separation of products for narrow fractions are presented. The combining of vortex vapor generation processes of preliminary heated oil in the field of inertia forces of rotating liquid with condensation processes of gaseous products at reduced pressure in vortex vapor condensers with cooled walls with utilization of subsequent heating and productions of fuels with narrow fraction composition permits to obtain a high quality product. New types of vortex devices are presented: the vortex separator of oil from water and admixtures, the vortex vapor generator for production of fine vapor fractions, the vortex vapor condenser for condensation of vaporized fractions, the vortex vapor generator in a catalyst layer moving in a boiling layer, which is a catalytic reactor with a regulated contact time between a catalyst and a boiling layer. A two-zone combustion furnace helps to decrease energy spending, improves combustion completeness.

9 Claims, 7 Drawing Sheets

SYSTEM FOR THERMAL AND CATALYTIC CRACKING OF CRUDE OIL

CROSS-REFERENCE TO RELATED APPLICATION

This application is based upon, and claims the benefit of, our Provisional Application No. 60/174,687, filed Jan. 6, 2000.

BACKGROUND OF THE INVENTION

1. Field of the Invention

The present invention relates generally to the field of separation technologies. In particular, this invention relates to separation of liquids from liquids and separation of gases from liquids. Even more particularly, this invention relates to refining of hydrocarbon liquids into fractions by distillation and/or thermal and catalytic cracking.

2. Description of the Prior Art

Prior systems for crude oil refining depend on gravitational fields for separation of oil from water and heavy admixtures from water-oil emulsion. Oil refining for fractions is carried out in the rectification columns (sometime called distillation towers), in which the separation efficiency of oil for fractions is low due to an insufficient value of the vapor pressure gradient created by the earth's gravitational field.

There are prior systems for oil refining at reduced pressure with utilization of vacuum pumps and without rectification columns, as described in U.S. Pat. No. 5,904,836 by Dae Sung Lee, et at., that permit reduction of the operating temperatures for cracking processes and improve quality of fractions separation. Here oil is heated in heat exchangers to temperatures higher than a fraction's boiling point. Then, this fraction is separated at reduced pressure in a centrifugal device from the rest of other heavier fractions, which separate light, and heavier fractions on the principle of separation of different densities by centrifugal forces. In this system, oil and water are separated in the settling volumes, which is a very slow process. There is no thermal catalytic reactor utilized in such a patent. Oil and all fractions are heated in heat exchangers to a temperature higher than a boiling point of one of the fractions. In heat exchangers, such oil heating causes appearance of a series of instabilities in the boundary between applied heat and liquid and vaporized fractions, similar to the effect which happens in heat exchangers utilized for oil vaporization in rectification columns. Also, the vacuum systems for oil refining are complex and characterized by low productivity of final products determined by the power of vacuum devices at pressures below $10^{-2}$ torr. Besides this, in high-vacuum systems the energy expenditures increase significantly for gas pumping, large dimension of vacuum pipelines, and products condensers.

In all previous oil separation systems for fractions, oil heating and evaporation that takes place in the tube furnaces require special equipment for stabilization of the boundary between the liquid-gas phases, so-called the boiling crisis, which complicates construction of the furnaces and heat exchangers, and limits vapor productivity. Standard rectification columns are bulky and have a limited lifetime of operation due to processes of chemical corrosion of their parts during interaction with sulfur, its compounds, and salts of different acids contained in oil. Gas separators for separation of oil fractions, which are made in the form of trays in the rectification columns, or centrifugal separators suggested in the above-mentioned patent are complex in construction, and have large dimensions and low productivity.

Prior systems for separation of immiscible liquids include a device called a hydrocyclone, as described in an article "The Theory and Applications of the Hydrocyclone" by Kelsal page 68–89 in the book "Solid-Liquid Separation" by Poole, et al., Chemical Publishing Company, INC., New York, 1968, and in a recent publication such as U.S. Pat. No. 5,667,686 by Schubert. These studies show that a hydrocyclone is utilized for separation of lower density liquid from a higher density liquid with a separation chamber of a conical shape with a gradual decrease in cross-sectional area throughout the entire length of the hydrocyclone. This type of separator usually has small size: a separation cylindrical section is about 10–15 cm in diameter, and the whole length is about 20–30 cm. Hydrocyclones have been in use for about two hundred years, but for the separation of liquids they have been used since early 1950's. Hydrocyclones have quite a few shortcomings such as low efficiency of separation, also inclination angles of input tubes are very critical. Small size hydrocyclones limits the separation by utilization of centrifugal forces only, and no evaporation processes or separation of liquids with different boiling temperatures were reported in experimental and theoretical studies of such devices.

There are prior systems for catalytic cracking of hydrocarbons with catalytic reactors, where catalytic reactors, as described in U.S. Pat. No. 4,664,888 by Castagnos, have substantial shortcomings such, as a difficulty in regulation of a contact time between a catalyst and a liquid hydrocarbon feedstock from about 0.2 s to 10 s, and providing a uniform interaction between catalytic particles and a liquid's volume passing through these particles. In some reactors, such as zeolitic cracking catalysis, there is high conversion activity, and it is necessary to have a contact time from 2.0 s to 5.0 s for obtaining necessary conversion, for example, of vacuum gas oil feedstock to middle distillate, gasoline, and other useful products. A contact time longer than 5.0 s of oil with catalyst which is past the optimum reaction contact time leads to excessive buildup of by-product coke on a catalyst surface and to a recracking of gasoline and middle distillate products and produces less desirable products.

SUMMARY OF THE INVENTION

In this invention the system of oil refining from admixtures and subsequent separation of purified oil for fractions in narrow temperature range with utilization of vortex devices, in which the inertia forces of rotating flow of liquid (oil or products of primary refinery) heated in a heat exchanger or a furnace to a certain temperature, develops a boiling layer with intensive output of created gas (vapor) bubbles into a region of reduced pressure (vortex) with an outflow of vapors into a volume, where vapors are condensed into liquid and directed into a reservoir for further refining of the liquid oil into hydrocarbon products.

The system of consecutive heating and extraction of products of definite fraction composition in such devices including vortex vapor generators permits obtaining pure homogenous products of oil refining with utilization of distillation and/or both thermal and catalytic cracking thereby producing significant simplification of the system design, and substantial reducing metal content and increasing capacity.

In oil refining processes using catalytic cracking, the main problem is combining a liquid boiling layer with a catalyst layer in the so-called catalytic cracking reactors with a pseudo-liquefied layer of a catalyst. The systems of this invention are designed to permit significant intensification of the processes of oil separation for fractions of narrow composition during thermal and catalytic cracking with stable combining of a liquid's boiling layer with a catalyst's moving layer.

The purpose of this invention is to provide a new devices and systems for oil refining and significant intensification of oil separation processes for fractions of narrow composition by utilization of inertia forces in rotating liquids and gases, which are the products of oil separation for fractions, through successive heating of liquid oil, or its remaining products to temperatures close to evaporation of light fractions and heavy fractions in the processes of oil distillation and/or thermal and catalytic cracking.

A combination of heat exchanging devices, where oil is heated at pressure without boiling, with vortex vapor generators providing volumetric boiling of liquid in the field of centrifugal forces developed by rotation of liquid itself provides an increase of several times a vapor output from a surface unit in comparison with conventional furnaces or straight-through boilers utilized in the existing technology with the refining columns. In the technology presented in this invention, a boundary of separation of liquid-vapor phases (vortex) is stable and clearly observable. In this scheme, the conditions for generation of low-frequency oscillations existing in heating tubes of straight-through boilers due to a position change of vapor-liquid boundary are eliminated. This produces an improvement in heat exchange intensity in the furnaces and heat exchangers, and helps to reduce their dimensions and cost.

In this invention, there are several vortex devices with a similar concept for the separation of liquids and gases (vapors) with different densities and boiling temperatures, with utilization of catalysts, and for the condensation of separated vaporized fractions.

The separation of liquids and gases (vapors) is provided by inertia forces of rotating liquids and gases (vapors) in a cylindrical volume. In these devices, a rotation of liquid and gases (vapors) leads to a development of a vortex along an axis of a device.

Let us consider a simplest case of a cylindrical vortex separator utilized for separation of water and heavy liquid admixtures from oil.

A pressure distribution P in a vortex chamber is determined by a dependence:

$$P = P_{in} + \rho v_{in}^2/2 - \rho v_\phi^2/2, \quad (1)$$

where $P_{in}$ is a liquid's (a mixture of oil, water and heavy liquid admixtures) pressure at a chamber entrance; $\rho v_{in}^2/2$ is a liquid's dynamic pressure at a chamber entrance; $\rho v_\phi^2/2$ is a dynamic pressure at any current radius r in a chamber; $\rho$ is a liquid's density; $v_{in}$ is a liquid's speed at a chamber entrance; $v_\phi$ is a liquid's azimuthal speed at any current radius r.

From the momentum conservation law:

$$v_{in} R_{in} = v_\phi r. \quad (2)$$

From (1) and (2) one can obtain $$P = P_{in} + (\rho v_{in}^2/2)(1 - R_{in}^2/r^2), \text{ or}$$

$$P/P_{in} = 1 - (\rho v_{in}^2/2) P_{in} (R_{in}^2/r^2 - 1). \quad (3)$$

A radius of a gas vortex developing in a liquid/liquid/gas vortex separator corresponds to a condition P=0, i.e. an equality to zero of a pressure difference between pressure on a liquid's surface and pressure in a gas vortex in equation (3). This condition holds at low evaporation intensity of liquids, which is a characteristic feature of water separation from oil.

At a given dimension of a vortex chamber $R_{in}$, a liquid's input speed at the entrance into a chamber $v_{in}$, and pressure $P_{in}$, a radius of gas vortex $r = r_v$, in this case, is determined from a relationship:

$$(\rho v_{in}^2/2 P_{in})(R_{in}^2/r_v^2 - 1) = 1. \quad (4)$$

Radii of a gas vortex $r_v$ for different ratios of dynamic pressures and liquid's pressures at an entrance into a vortex separator's chamber with a radius $R_{in} = 0.5$ m are given in Table 1:

TABLE 1

| $\rho v_{in}^2/2P_{in}$ | 0.5 | 0.25 | 0.2 | 0.1 |
|---|---|---|---|---|
| $r_v/R_{in}$ | 0.578 | 0.447 | 0.408 | 0.302 |
| $r_v$, m | 0.289 | 0.223 | 0.204 | 0.151 |

For the particular case of $v_{in} = 20$ m/s, a liquid's dynamic pressure is $\rho v_{in}^2/2 = 2 \cdot 10^5$ Pa≈2 atm and liquid's pressures $P_{in}$ utilized in Table 1 are from 4 atm to 20 atm.

A first device utilizing inertia forces of rotating liquids and gases (vapors) is a vortex separator.

The principle of oil separation from water of the vortex separator is based on the known effect of water droplet deposition from liquid with lower density under accelerating forces. A deposition speed for water droplets in gravitation, or acceleration forces $v_d$ is determined by the formula [V. G. Levich, Physical-Chemical Hydrodynamics, published by Fizmatgiz, M., 1959, page 430]:

$$v_d = [(2/3)(\rho_1 - \rho_2)(ga)/(k_f \rho_1)]^{1/2}, \quad (5)$$

where $\rho_1$ and $\rho_2$ are water and oil densities; g is a gravity acceleration equal to 9.81 m/s$^2$; a is a water droplet radius which is equal approximately to 1 mm; $k_f$ is a friction coefficient which is equal to approximately 1, $\rho_1 \cong 1$ g/cm$^3$, $\rho_2 \approx 0.9$ g/cm$^3$, or $v_d = 2.56$ cm/s.

A tangential introduction of a water-oil mixture with a speed of 20 m/s into the vortex chamber with an internal radius of 0.5 m provides an increase of a centrifugal force applied to a volume of liquid $F_{acc} = m v_\phi^2/r$ as much as a centripetal acceleration exceeds a gravity acceleration: $j_{cp}/g = v_\phi^2/rg \cong 80$, at $v_\phi = 20$ m/s and r=0.5 m. It is clear that a separation efficiency of oil and water, in this case, increases substantially, and, from the above formula, for the same droplet's radius a=1 mm a water deposition speed $v_d = 22.8$ cm/s. Also, it is necessary to take into account that at a distance closer to a vortex chamber center, a liquid azimuthal speed increases substantially proportional to a radius, and centripetal acceleration $j_{cp}$ is significantly higher: for example, at a $r_v/R_{in} = 0.447$ (Table 1, example #2), $r_v = 0.223$ m, which is a boundary between a rotating liquid and a vortex, a liquid azimuthal speed $v_\phi = 44.8$ m/s and $j_{cp} = v_\phi^2/r_v \approx 917$ g, or a separation efficiency increases significantly: $v_d = 77.5$ cm/s, and even for a droplet's radius equal to 1 μm a deposition speed $v_d = 7.7$ cm/s.

A second device, a vortex vapor generator is utilized for enhancement of vapor output intensity resulting from an increase in a bubble up floating speed in a field of accelerating forces.

Application of the law of momentum conservation for a liquid rotating in a cylinder gives the following relationships: $\rho(v^2/r)r = \text{const}$, or $\rho v^2 = \text{const}$, and $P + \rho(v^2/2) = \text{const}$, where ρ and P are liquid's density, and pressure. From here, $v_{in}R_{in}=v_\phi r$, where R is a cylinder's radius, r is a current radius, $v_{in}$ is a liquid's speed at a chamber entrance, $v_\phi$ is an azimuthal speed at a radius r, with accuracy of an influence of friction forces. From these relationships, a component of an azimuthal speed of a liquid increases proportional to r and pressure decreases proportional to $r^2$. Thus, in a chamber with rotating liquid heated close to boiling point, there is always a radius where a pressure of the saturated vapor of a heated liquid, or a fraction of this liquid at given temperature is equal to a pressure in a liquid. A further decrease of pressure leads to a liquid's boiling in a volume with development of vapor bubbles up floating to a generator's axis under influence of a pressure gradient. The condition for equilibrium of vapor pressure on a line of saturation is determined by the Clapeyron-Clausius equation.

A significant pressure difference along a radius substantially increases the up floating speed of bubbles of evaporating liquid up to tens of meters per second.

One of the most important factors of conventional rectification columns is a speed of evaporation of different oil fractions in columns, which take place in the form of up floating vapor bubbles. Experimental data on a speed of vapor bubbles up floating in the earth gravitational field that takes place in conventional rectification columns, show that this speed is approximately 15–20 cm/s [Levich, Physical-Chemical Hydrodynamics, published by Fizmatgiz, M., 1959, pages 446–447].

A speed of vapor bubbles in the field of acceleration forces according to a simple approximation given by the Stokes formula is $$w=ja^2/3v, \quad (6)$$

where w is a vapor bubble speed; j is acceleration, which is equal to 9.81 m/s$^2$ for the earth gravitational field, and, in the case of rotating liquid, $j=v_{in}^2/r$. For example, for $v=v_{in}=20$ m/s and $r=R_{in}=0.5$ m, j is equal to 800 m/s$^2$, if a is a bubble's diameter equal to 2 mm; v is a viscosity equal to about $10^{-4}$ m$^{-2}$s$^{-1}$. A substitution of j=g=9.81 m/s$^2$ and j=800 m/s$^2$ into Stokes formula gives, correspondingly, 20 cm/s and 16.6 m/s.

More detailed estimations of vapor bubble speed indicate that, in the case of rotating liquid inertia forces, it is necessary to take into account an increase of bubble vapor speed from a peripheral part of a cylindrical volume into an axial direction, a mass and energy exchange between vapor bubbles and liquid, influence of viscous friction on speed of vapor bubbles with changing (increasing) dimensions during up floating motion toward a vortex axis. Therefore, an evaporation intensity developed in the field of inertia forces of rotating liquid is much higher than evaporation from a motionless liquid surface, or from a heated surface of a volume in the gravitation field.

Developed vapors of light fractions flow out through a central opening of a vortex vapor generator into a vortex vapor condenser, which is a third device of this invention, and a remaining liquid containing heavier oil fractions moved from that vortex vapor generator and supplied by pumps into another stage for separation of heavier fractions.

Reducing pressure at a vortex vapor generator exit, it is possible to change conditions for boiling in a vortex of a vortex vapor generator. Instead using the regular 1 atm, pressures in a vortex can be substantially lower through pumping changes. Thus, it is possible to separate fractions with boiling points which are close at a pressure 1 atm, and different at lower pressures.

A second stage includes devices for heating of an exiting liquid to a temperature higher than in a first stage and necessary for evaporation of corresponding fraction, through a vortex vapor generator similar to operation of a first stage vortex vapor generator together with a vortex vapor condenser. All consecutive stages assigned for separation of heavier fractions are similar to that described above and differ only by ranges of temperatures and pressures. Most heavy residual fractions of oil rectification can be directed into a special reservoir connected to a catalytic reactor described later herein, where a process of catalytic cracking in a boiling layer is realized.

Such sequential vortex device based oil refinement for fractions eliminates cumbersome rectification columns, increases oil refinement productivity, improves product quality, and improves safety in refining plants.

Safety is a big problem in oil refining. Accidents, and explosions in refining plants happen frequently ["Blasts, but not from the past" by Lavelle, U.S. News & World Report, Jul. 17, 2000, pages 18–20]. They are caused by a presence of large volumes of highly flammable hydrocarbons, large structures, and people's errors. In this invention, a refinery based on utilization of vortex devices with comparatively small volumes of oil in the cylindrical devices of about 1 m length and a diameter of about 1 m, can process 6 million tons of oil per year which is equivalent of 103,000 barrels per day, or 190 kg/s. In this case, oil is supplied into a vortex separator with a speed of 20 m/s. Such refinery is easy to be controlled and computerized, each vortex device can be substituted with similar device. In special cases such as strong weather storm, or if it is necessary to stop one of devices for service, liquid or vapor flows can be send into the same type parallel device.

In addition, application of devices of this invention with inertia acceleration significantly exceeding gravity force permits utilization of practically any arrangement of equipment, not necessarily with a vertical placement.

Vortex vapor condensers of light and any other oil fractions of this invention have similar design with the vortex vapor generator distinguished with a feature that, in order to increase a vapor phase condensation intensity, the vortex vapor condenser walls must be cooled. Excessive pressure of vapor in the vortex vapor generator corresponding to a saturated vapor pressure at an evaporation temperature and a reduced pressure of condensation provides a critical pressure difference at the condenser entrance, when a liquid flow in a pipe connecting a vortex vapor generator with a vortex vapor condenser reaches a liquid's local speed of sound, which is called a critical speed. As a result, supersonic flow conditions for heated vapors are realized preventing an influence of low frequency and high frequency (acoustic) pressure oscillations, that are possible during condensation processes, on the vortex vapor generator operation.

For example, a ratio of pressures $P_o/P_{cr}$, necessary for achieving a critical pressure $P_{cr}$ (and critical speed $v_{cr}$ which is equal to a local speed of sound c* in a nozzle, or a pipe) with heating and supply of a gas (vapor) mass flow is $$P_o/P_{cr}=[(k+1)/2]^{(k-1)/k}, \quad (7)$$

where $P_o$ is a pressure in a vortex of a vortex vapor generator, $P_{cr}$ is a pressure at exit channel from a vortex vapor generator, $k=c_p/c_v$ is a ratio of specific heats.

For hydrocarbons of $C_5H_{10}$ type a value $k=c_p/c_v$ is in a range 1.1–1.2. Then, $P_o/P_{cr}=1.7-1.77$. A vapor pressure in a vortex of a vortex vapor generator $P_o=1$ atm, a pressure at an exit from a vortex vapor generator nozzle according to (7) is $P_{cr}=0.59-0.57$ atm which is realized at a vapor pressure in a vortex condenser P<0.5 atm caused by intensive cooling.

A fourth device of invention is a vortex vapor generator with catalyst particles. When running catalytic processes for heavy oil residuals, the same principles and similar devices described above are utilized. A difference is that a catalyst is introduced into a boiling layer in a rotating liquid. Depending on a size and mass of a catalyst m, particles occupy a very definite position between a vortex and a cylindrical wall along a radius r in the catalytic vortex vapor generator caused by a ratio of forces created by a centripetal acceleration and a pressure P of a liquid applied to a catalyst particle, $mv_\phi^2/r \sim PS$, where S is the area of a catalyst particle midsection. The positions of catalyst particles are established independently of possible deviations of a liquid's radial speed $v_r$ and pressure oscillations in it. These disturbances can cause insignificant change in particles position along the radius.

Here is a simple physical-mathematical proof for the above said statements about catalytic particles rotating in a catalytic reactor presented in this invention. A solid particle of mass m coming into a flow of rotating liquid moves along a circle of the constant radius r if there is the condition for equality of forces in liquid applied to a particle, which are inertia forces $mv_\phi^2/r$ and pressure forces $PS=P\rho_c \pi a^2$, i.e.

$$mv_\phi^2/r + P\rho_c \pi a^2 = 0, \qquad (8)$$

where $\rho_c$, $v_\phi$, are particle's density, speed, and a is a radius of spherical particle. In this equation, it is possible to not include friction forces, because they only decrease a circular speed of liquid and particle. Taking into account the momentum conservation law: $v_\phi r = \text{const}$, and following from this law the relationship: $v_\phi^2 = v_{in}^2 R_{in}^2/r^2$, equation (8) can be transformed into the equation:

$$mv_{in}^2 R_{in}^2/r^3 - \pi a^2 [P_{in} - (\rho v_{in}^2/2)(R_{in}^2/r^2 - 1)] = 0. \qquad (9)$$

In equation (9) it is taken into account that $$P = P_{in} + \rho v_{in}^2/2 - \rho v_\phi^2/2, \qquad (10)$$

where $P_{in}$, $v_{in}$, $\rho$ are liquid's pressure, speed, and density at the entrance into cylindrical catalytic reactor; values $v_\phi$ and $\rho$ are liquid's values at a current radius r; $\rho_c$ is a catalyst particle density. Taking into account that $m = \rho_c 4\pi a^3/3$, equation (9) can be reduced to the following form:

$$r^3 - R_{in}^2 r/(P^*+1) - (8/3)(\rho/\rho_c)[R_{in}^2/(P^*+1)]a = 0, \qquad (11)$$

where $P^* = P_{in}/(\rho v_{in}^2/2)$.

For determination of a catalyst particle radius a as a function of liquid's parameters and a radius r of particle's stationary motion in a circle, equation (11) can be transformed and the catalyst's radius will be determined from the expression:

$$a = (3/8)(\rho/\rho_c)[(P^*+1)/R_{in}^2]r[r^2 - R_{in}^2/(P^*+1)]. \qquad (12)$$

From equation (12) follows that the catalyst's particle radius is a function of liquid's parameters ($\rho$, $v_{in}$, $P_{in}$), of the radius of catalytic reactor $R_{in}$, and the catalyst density $\rho_c$. The values of minimum radius r for different values $P^*$ calculated from (12) for $R_{in}=0.5$ m are given in Table 2.

TABLE 2

| P* | 1 | 2 | 3 | 4 | 6 | 8 | 10 | 12 | 14 |
|---|---|---|---|---|---|---|---|---|---|
| r, m | 0.35 | 0.29 | 0.25 | 0.22 | 0.19 | 0.17 | 0.15 | 0.14 | 0.13 |

As an example, for the calculation of value a the following values of a catalyst density $\rho$ and ratios of liquid's density to catalyst density $\rho/\rho_c$ are given in Table 3.

TABLE 3

| $\rho_c$, kg/m³ | 2000 | 2200 | 2400 | 2600 | 2800 |
|---|---|---|---|---|---|
| $\rho^* = \rho/\rho_c$ | 0.475 | 0.432 | 0.396 | 0.365 | 0.336 |

In these conditions, the dependence determining the catalyst's particle radius according to formula (12) is $$a = 1.5 \rho^* r [r^2(P^*+1) - 0.25] \, \mu m \qquad (13)$$

The results of calculations from equation (13) for the catalyst's particle radius a in $\mu$m are given in Table 4.

TABLE 4

| P* | $\rho^*$ | 0.475 | 0.432 | 0.396 | 0.366 | 0.339 |
| | r, m | a, $\mu$m | a, $\mu$m | a, $\mu$m | a, $\mu$m | a, $\mu$m |
|---|---|---|---|---|---|---|
| 1 | 0.354 | 159 | 145 | 133 | 122 | 114 |
| 2 | 0.290 | 475 | 432 | 396 | 366 | 339 |
| 3 | 0.251 | 358 | 326 | 298 | 276 | 256 |
| 4 | 0.225 | 500 | 455 | 417 | 385 | 357 |
| 6 | 0.190 | 366 | 333 | 305 | 282 | 261 |
| 8 | 0.168 | 481 | 438 | 401 | 371 | 343 |
| 10 | 0.152 | 449 | 408 | 374 | 346 | 320 |
| 12 | 0.140 | 479 | 436 | 400 | 369 | 342 |
| 14 | 0.130 | 324 | 295 | 270 | 250 | 231 |

Estimations of catalyst dimensions show that, with constant liquid parameters at entrance into the catalytic vortex reactor and given catalyst density $\rho_c$, a change of the radius r substantially influences on the particle's radius a. Increasing a liquid's pressure ratio to dynamic pressure $P^*$ at the entrance into the catalytic vortex reactor decreases the circular radius of particle motion r for catalysts of the same mass m. By increasing the catalyst's density $\rho_c$ the catalyst particle radius a decreases for rotation at the same radius in the catalytic vortex reactor chamber.

These calculations show that in the catalytic vortex reactor with boiling layer it is possible to utilize catalysts of spherical shape with diameters of about 0.1–1 mm.

The circular radius r of the catalytic layer where the catalyst particles rotate is from 0.13 to 0.354 m when the reactor's chamber radius $R_{in}=0.5$ m.

In the organization of catalytic process of oil products in a boiling layer it is also important to have a stable layer of catalyst particles to combine a boiling layer with a layer occupied by catalyst particles. Stability of catalyst particles during rotation in liquid is analyzed as follows.

The equation of motion for a solid particle of mass m in a cylinder in the projection on axis r is determined by the inertia, pressure and friction forces applied on this particle:

$$mdv_r/dt = -PS - k_f v_r. \qquad (14)$$

It is assumed that a friction force is proportional to a speed $v_r$ which is typical for low Reynolds numbers, a particle area is $S = \pi a$, a is a particle's radius. Pressure in rotating liquid, as was mentioned above, is proportional to $r^2$. After expanding the function P(r) into the Taylor series in the vicinity of $r = r_o$ and taking only a linear member of the series, one can find $$mdv_r/dt + k_f v_r + (P_o/r_o)\pi a^2 r = 0. \qquad (15)$$

This equation can also be presented in the form:

$$\ddot{x} + (k_f/m)\dot{x} + (P_o \pi a^2/mr_o)x = 0, \qquad (16)$$

where $x = r$; $v_r = dr/dt = \dot{x}$; $dv_r/dt = d^2r/dt^2 = \ddot{x}$.

Equation (16) is the equation of decaying oscillations which can be presented in the classic form:

$$\ddot{x}+2\delta\dot{x}+\omega^2 x=0, \quad (17)$$

where $\delta=k_f/2m$; $\omega^2=P_o\pi a^2/(mr_o)$

The solution of equation (17) is well known in physics text books. Its analysis shows that a motion of catalyst particles in a boiling layer is stable at small disturbances. Since a catalytic cracking is utilized with a liquid having relatively high viscosity and at elevated temperatures, an increase of the friction force will only help the stabilization of catalyst particles in a boiling layer.

Thus, selecting catalyst particles size and mass makes it possible to combine their position in the catalytic vortex vapor generator with the boiling layer (catalytic reactor) and thus provide a more efficient and intensive catalytic processing of oil products. A change of catalyst particle dimensions and their mass in a process of catalytic cracking produces a low effect on the efficiency of catalysis, because it leads only to the expansion of the layer occupied by catalyst particles in a boiling liquid. A process of catalyst substitution in the boiling layer is either continuous, or periodical depending on intensity of catalyst particles poisoning by acid containing compounds, and due to deposition of metals on their surface. Catalyst regeneration can be done using conventional existing catalyst regeneration systems.

A variation of liquid and catalyst parameters (liquid's pressure, speed, temperature, and catalyst particles mass and dimension) and catalytic vortex reactor dimensions (diameter and length) can help to improve a cracking system that provides optimum contact time between the catalyst and the liquid.

The interaction time between liquid and catalyst particles is determined by their relative speed $v_r$, which is a radial speed of liquid, and a thickness of catalyst layer $\delta$:

$$\tau=\delta/v_r. \quad (18)$$

In a vortex chamber of the radius R, in general, a liquid has all three components of speed: $v_\varphi$, $v_r$, $v_z$. At the radius larger than the vortex radius $r_v$, there are two components of speed: $v_r$ and $v_\varphi$. Because there is no pressure gradient along axis z, a value $v_z=0$.

The azimuthal speeds of liquid and catalyst particles are practically the same. A relative speed $v_r$ determining the interaction time between liquid and catalyst particles $\tau$ depends on the liquid's mass flow $\dot{m}$ passing through catalyst:

$$\dot{m}=\rho v_r F, \quad (19)$$

where $F=2\pi rL$ is the area occupied by a catalyst particles layer in the chamber, r is the catalyst layer mean radius in the cylindrical catalytic reactor, L is the catalytic reactor length.

As the example, let us give the estimations of the interaction time $\tau$ of catalyst with liquid. In Table 5 one can see data for the small reactor with the characteristic parameters: L=R=0.125 m, $\delta$=0.005 m (5 mm), $\rho$=0.9×10³ kg/m³.

TABLE 5

| $\dot{m}$, kg/s | 0.5 | 1.0 | 2.0 | 3.0 | 4.0 | 5.0 |
|---|---|---|---|---|---|---|
| r, m | $\tau$, s | $\tau$ | $\tau$ | $\tau$ | $\tau$ | $\tau$ |
| 0.04 | 0.28 | 0.14 | 0.07 | 0.047 | 0.035 | 0.028 |
| 0.06 | 0.42 | 0.21 | 0.106 | 0.07 | 0.053 | 0.042 |
| 0.08 | 0.56 | 0.28 | 0.14 | 0.094 | 0.07 | 0.056 |
| 0.1 | 0.71 | 0.35 | 0.176 | 0.118 | 0.08 | 0.07 |

For this small catalytic reactor the increase of the reactor's length to 0.25 m and the catalyst layer to 2 cm the interaction time $\tau$ between catalyst particles and liquid increases in 8 times, at the same mass flow this time will be in the range 5.65–0.224 s.

In Table 6 one can see the values for the interaction time between catalytic particles and liquid for larger reactor with the characteristic parameters: L=R=0.5 m, $\delta$=0.05 m (5 cm), $\rho$=0.9×10³ kg/m³.

TABLE 6

| $\dot{m}$, kg/s | 50 | 75 | 100 | 125 | 150 |
|---|---|---|---|---|---|
| r, m | $\tau$, s | $\tau$ | $\tau$ | $\tau$ | $\tau$ |
| 0.2 | 0.056 | 0.038 | 0.028 | 0.023 | 0.019 |
| 0.25 | 0.07 | 0.047 | 0.035 | 0.028 | 0.024 |
| 0.3 | 0.085 | 0.056 | 0.042 | 0.034 | 0.028 |
| 0.35 | 0.1 | 0.066 | 0.05 | 0.04 | 0.033 |
| 0.4 | 0.113 | 0.075 | 0.056 | 0.045 | 0.038 |

Similar increase of the interaction time of catalyst particles with liquid takes place in larger reactor with the change of its dimensions and catalyst's layer thickness. Thus, at L=1.5 m and $\delta$=20 cm, the interaction time $\tau$=0.68–0.114 s. With the decrease of liquid's mass flow to $\dot{m}$=25 kg/s the interaction time $\tau$=1.36–0.228 s.

The interaction of fractions vapors (catalysis products) with catalyst is significantly shorter in time, because the speed of vapor bubbles developed in the field of inertia forces exceeds the liquid's radial speed. In the above given examples, the liquid's radial component is in the range $v_r$=0.001–0.27 m/s. The speed of vapor bubbles is w=10–20 m/s, or by two orders of value is larger than the liquid's radial speed $v_r$. In other words, a probability for the change of developed fractions due to interaction of bubbles with catalyst is negligible.

Products obtained during catalytic cracking and containing an admixture of hydrocarbons can be exposed to repeated separation for narrow fractions after condensation and direction into a system of separation in consecutively operating vortex vapor generators and corresponding vortex vapor condensers, similar in design described above.

This invention of deep oil separation for fractions provides high productivity and quality of obtained products in processes of thermal and catalytic cracking with utilization of unified vortex separators, vortex vapor generators, vortex vapor generators with a catalyst, and vortex vapor condensers similar in design, permits considerable reduction of costs in utilization of standard equipment, their dimensions, ensuring operational safety in oil refining plants and permits significant improvement of ecological situation around such plants. For the implementation of such process the system of oil refining of the invention includes the following components:

A first unit of preliminary oil purification from mechanical admixtures, water and satellite gases contained in crude oil. This unit includes:
 (a) A reservoir containing crude oil that can be replaced by oil supplied directly from an oil pipeline;
 (b) A pump to supply crude oil into a vortex separator for separation of water and admixtures from oil;
 (c) A coarse filter for oil purification from mechanical admixtures (solid particles);
 (d) A heat exchanger for preliminary heating of crude oil with a purpose of reducing viscosity and decreasing of costs for pumping;
 (e) A vortex separator for separation of oil from satellite gases, water and dissolved in it salts and acid containing compounds; and (f) Pumps for oil supply to consecutive units (terminals) for separation into fractions, water removal, and into extraction systems for recovery of useful products such as satellite gases: hydrogen, oxygen, nitrogen, and others.

To increase the level of crude oil purification from water, the water/oil separation process can be performed in two, or more separators operating in series.

A second unit provides deep oil separation for fractions which consists of multiple consecutive stages of heating, evaporation of initial oil and residual products of separation in processes of thermal separation, and cracking, including:

(a) Intermediate furnaces, or heat exchangers utilized for heating of the initial product (purified oil) to temperatures close to evaporation of a fraction of given composition;

(b) Vortex vapor generators that provide intensive process of evaporation in a volume of rotating liquid. Extracted evaporation products are directed into vortex vapor condensers. A liquid not evaporated after exit of a first fraction is transferred by a pump into the next separation stage for heating and direction into a vortex vapor generator with a vortex vapor condenser. This separation process is determined by the requirement of how many fractions to be extracted and continued as a sequence of fraction separators, condensers, heaters, etc;

(c) Vortex vapor condensers for gas products of oil distillation with a corresponding cooling system as one of its construction elements. Condensation heat from vortex vapor condensers can be utilized for preliminary heating of crude oil, or for intermediate stages of oil separation for fractions. Liquid products from vortex vapor condensers of separate stages are supplied by a pump into corresponding reservoirs.

In further organization of the thermal distillation and thermal and catalytic cracking process in the present invention a third unit of catalytic cracking for heavy products of oil distillation for fractions is included, which consists of the following components:

(a) A tubular furnace utilized for heating of the initial product up to temperatures corresponding to heavy fractions boiling in a range of 300–500 C. For obtaining of more narrow fractional composition of catalytic products, a furnace and heat exchangers provide heating of the initial product in sufficiently narrow range of different temperatures distinguished by intensity of heat exchange inside the furnace. This eliminates the necessity for utilization of several furnaces for successive heating of initial components;

(b) A vortex vapor generator with the catalyst's layer moving in a liquid's boiling layer, or a catalytic reactor;

(c) A system of catalyst introduction and extraction from the boiling layer of the vortex vapor generator, i.e. a catalyst's circulation system;

(d) A catalyst's regeneration system, which includes currently existing regeneration equipment;

(e) A vortex vapor condenser for products resulting from catalytic action, and pumps transporting a condensate into corresponding reservoirs.

A sequence in oil separation processes for fractions described above with utilization of catalysis of heavy remains after thermal cracking permits obtaining high quality products.

A similar technological scheme can be utilized also in a high temperature pyrolysis of residual products of thermal cracking at higher temperatures of 600–1300 C.

The suggested technology of oil refining of this invention does not exclude application of vacuum systems at a stage of obtaining of heavy oils with a low saturated vapor pressure at temperatures not requiring refrigerating machine utilization in a technological process. Application of vacuum pumps and equipment for light fractions of distilled and thermally cracked products is not expedient due to low productivity of such devices.

BRIEF DESCRIPTION OF DRAWINGS

The main features of this invention are represented in the figures of which.

DESCRIPTION OF THE PREFERRED EMBODIMENTS

Figure 1:
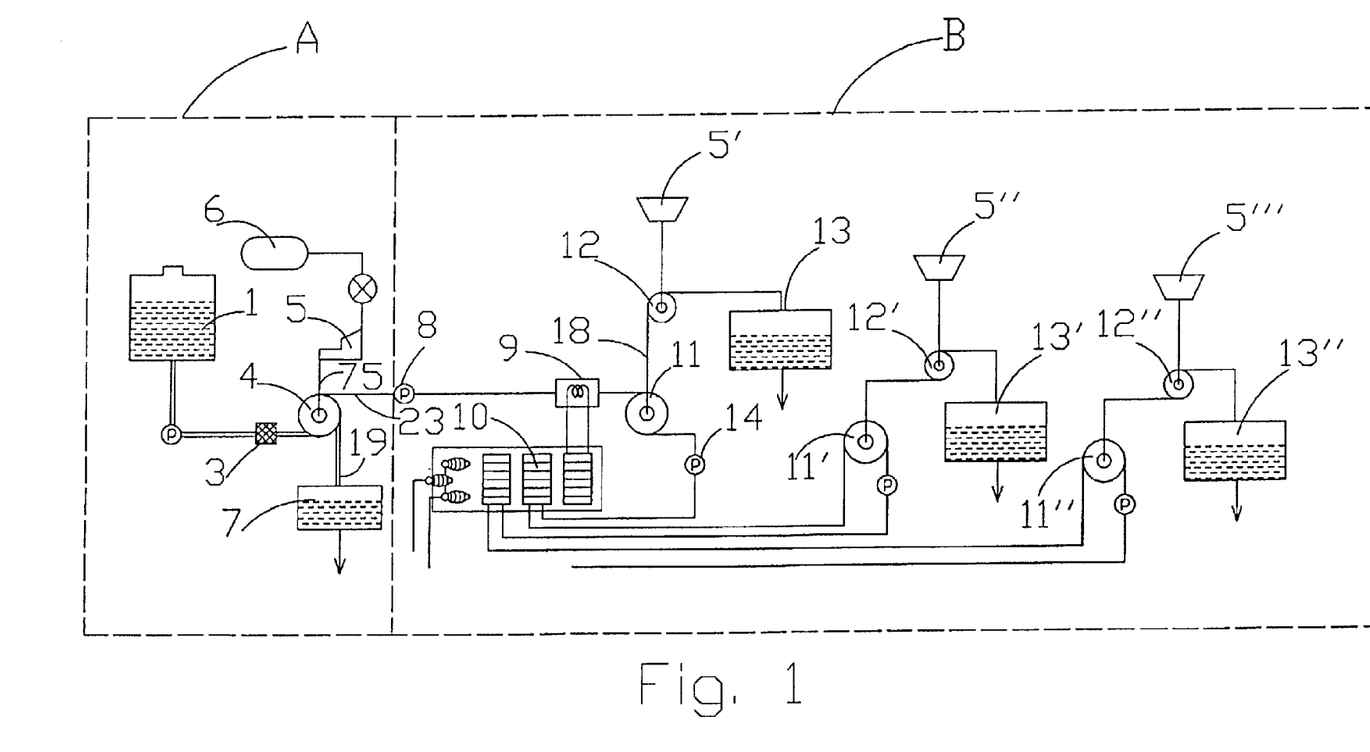
FIG. 1 is a general schematic diagram of oil refining processes with a unit of preliminary purification of crude oil from admixtures.

Scheme of Technological Process for Oil Distillation and Thermal Cracking Separation In FIG. 1 consecutive technological process stages for preliminary refinement of crude oil and fraction distillation during thermal separation are illustrated.

There are two units in this arrangement. Unit A contains devices utilized for primary purification of a crude oil from water and admixtures. A non-purified raw oil, i.e., a crude oil from a reservoir 1, or directly from an oil pipeline by a pump 2 is supplied through a coarse filter of mechanical admixtures 3 into a vortex separator 4 where separation of oil from gas admixtures and water takes place. Satellite gases $H_2$, $N_2$, $O_2$, $H_2S$ and others are separated from water and oil mixture and directed through a pipeline 75 into a compressor 5 for pumping into containers 6. Water separated from oil in the vortex separator 4 is directed through a pipeline 19 into a reservoir 7.

Figure 2:
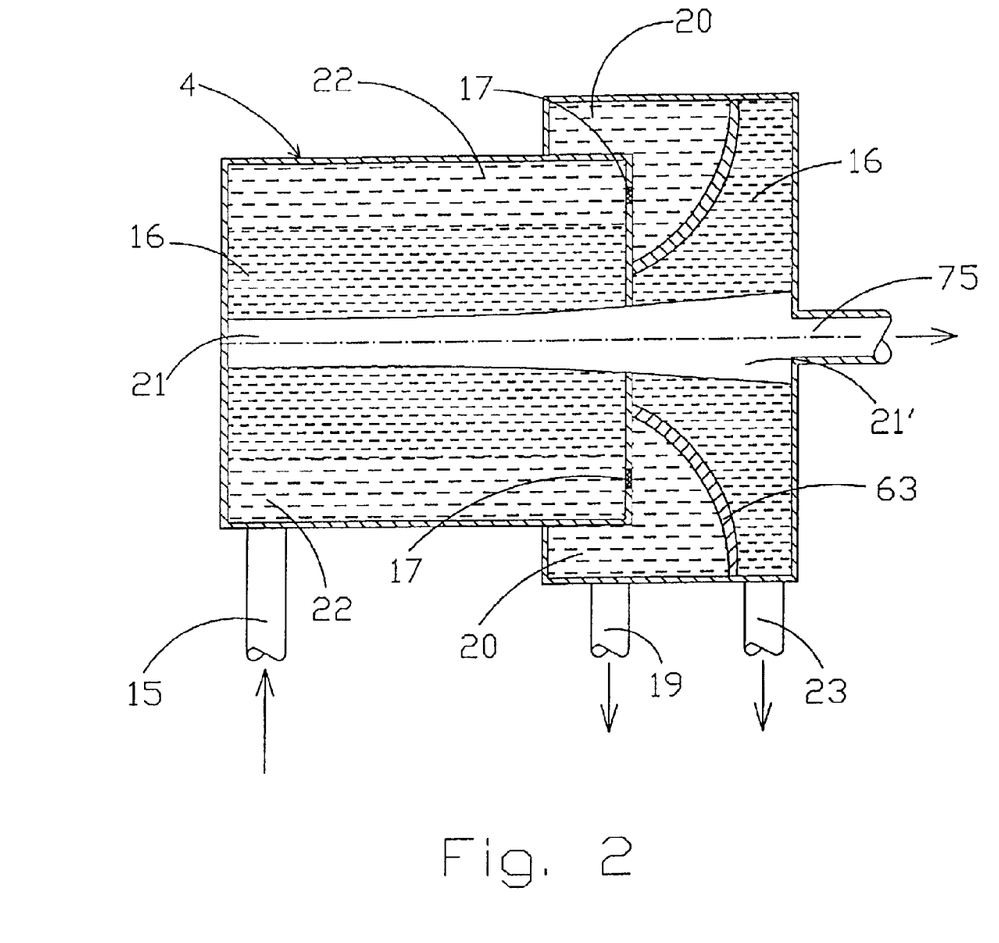
FIG. 2 is a cross-sectional view of a vortex separator for purification of crude oil from gases, water and heavy admixtures.

The design of the vortex separator 4 is illustrated in FIG. 2. A crude oil purified in the vortex separator 4 is supplied by a pump 8 into a unit B shown in FIG. 1 for a thermal separation for fractions. The unit B for a thermal separation comprises: the pump 8, which provides through a pipeline 23 a purified oil preliminarily heated in a heat exchanger 9 of a tubular furnace 10 into a vortex vapor generator 11. The details of the tubular furnace 10 are described below by reference to FIG. 7.

The tubular furnace 10, or the heat exchanger 9 heat the initial purified oil to a temperature corresponding to boiling of light fraction, however, its temperature doesn't reach a boiling point of light fraction at applied liquid's pressure before coming into the vortex vapor generator 11. The vortex vapor generator 11 provides boiling of light fraction; separates vaporized light fraction and remaining liquid products. Light vaporized fraction is directed into a vortex vapor condenser 12 and after condensation, in a form of liquid is transferred into a reservoir 13 for a liquefied light oil fraction. A pump 14 supplies remaining liquid products after the first stage of separation into the next stage through the furnace 10.

All consecutive stages for oil separation for fractions (vortex vapor generators denoted in FIG. 1 by 11, 11' and 11", vortex vapor separators denoted by 12, 12' and 12", and their reservoirs denoted by 13, 13' and 13", etc.) contain similar unified elements distinguished from elements of the first stage by a temperature value for heating of liquid phase, by pressure, mass flow, cooling conditions and condensation into the liquid state in the vortex vapor condensers.

Some vapors that are not condensed in the vapor vortex condensers 12, 12', and 12" are directed into compressors 5', 5", and 5'".

In a combination of thermal and catalytic oil cracking in one technological chain a unit C can be included, shown and described below by reference to FIG. 6. It has additional systems for a catalyst circulation and its regeneration, as it was described above. If necessary, for obtaining heavy oils of narrow fraction composition, vacuum pumps for pressure reduction in the catalytic reactor with a boiling layer can be included in the unit C.

Operation Principle and Design Features of the Vortex Separator

The vortex separator 4 for preliminary crude oil purification from water and admixtures, which principal design scheme is shown in FIG. 2, consists of the following elements:

A tangential supply 15 of crude oil with a speed of at least 10 m/s and preferentially from 15 m/s to 30 m/s into a cylindrical chamber of the vortex separator 4, a container of purified oil 16, a chamber for water and heavy admixtures collection 20 connected with a cylindrical chamber of the vortex separator 4 through holes 17, a pipeline 75 for output of satellite gases coming out from water and oil into a vortex 21 in a back side of the vortex separator chamber by tangential holes for output of purified oil 23 and a pipeline for water output 19.

As it was above noted, in a cylindrical chamber with rotating liquid where a low viscous liquid has speed increased proportional to a decrease of a radius, pressure drops proportional to the square of a radius. In a heavy viscous liquid, this effect is weakened due to friction with walls of the chamber and intermolecular friction in liquid; however, the effect of efficiency increase for oil separation from water in the vortex separator is quite high. In addition, a pressure reduction in a direction to a vortex chamber axis promotes development of bubbles of gases dissolved in a liquid mixture and bubbles up floating to an axis under a pressure gradient influence. An emersion of gas bubbles leads to development in the vortex chamber of a gas vortex 21 with pressure corresponding to a sum of gases partial pressures at temperature of oil from where gases come out. Satellite gases desorbed from the mixture and floated into a vortex are removed through the central opening 75, that has a diameter smaller than a gas vortex diameter 21'.

Water, as the heavy fraction of the initial mixture, is forced radially outwardly in the chamber 4 to a peripheral region 22 of the vortex chamber and through openings 17 into a chamber for water collection 20, from where it is transported through the pipe 19 into a corresponding reservoir 7 (shown in FIG. 1). A profiled exit baffle 63 in the vortex separation chamber provides a smooth exit of oil cleansed from water into the chamber 16, from where it is transferred through a tangential channel 23, or several channels and comes into a pump 8 for a supply of cleansed crude oil into the unit B of the fraction separation as illustrated in FIG. 1. The efficiency of oil cleansing from water is controlled by a measurement of a specific electrical resistance in water coming from the vortex separator.

It is possible to increase the oil separation efficiency from water by a repetition of the process in a sequential vortex separator. This invention provides the method, which is faster, simpler, cheaper and safer than utilization of high electrical fields and demulsifying reagents in a crude oil. Water coming out from a water-oil mixture contains valuable chemicals in the form of compounds and salts of metals (V, Ni, Fe, Cu, Na, and others), which will be extracted from it by other successive technological processes having no relation to fraction oil separation. The gases released from crude oil during oil-water separation are directed into existing systems for their processing. These gases usually contain nitrogen, hydrogen, oxygen and more complex compositions, such as sulfur compounds.

In the process of oil separation from water and dissolved in water salts, sulfuric acid, and other acids, sulfur compounds such, as hydrogen sulfide $H_2S$, are removed from oil together with water. Indissolvable small particles of metal salts and compounds with organic acids also are removed with a water flow by the field of centrifugal forces. A change of temperature regime for separation of liquids and gases in the vortex separator simultaneously permits enhancing the effect of a crude oil desulfurization, since there is no heating of all oil components to the boiling temperatures as it done in rectification columns.

Basic devices providing the oil separation for fractions in the unit B are shown in FIG. 1.

For better understanding of processes taking place for realization of this invention for separation for fractions, it is helpful to have a more detailed description of evaporation processes in the vortex vapor generator 11, a vapor condensation in the vortex condenser 12, and also designs of these devices.

Operation Principle and Design Features of the Vortex Vapor Generator

Figure 3:
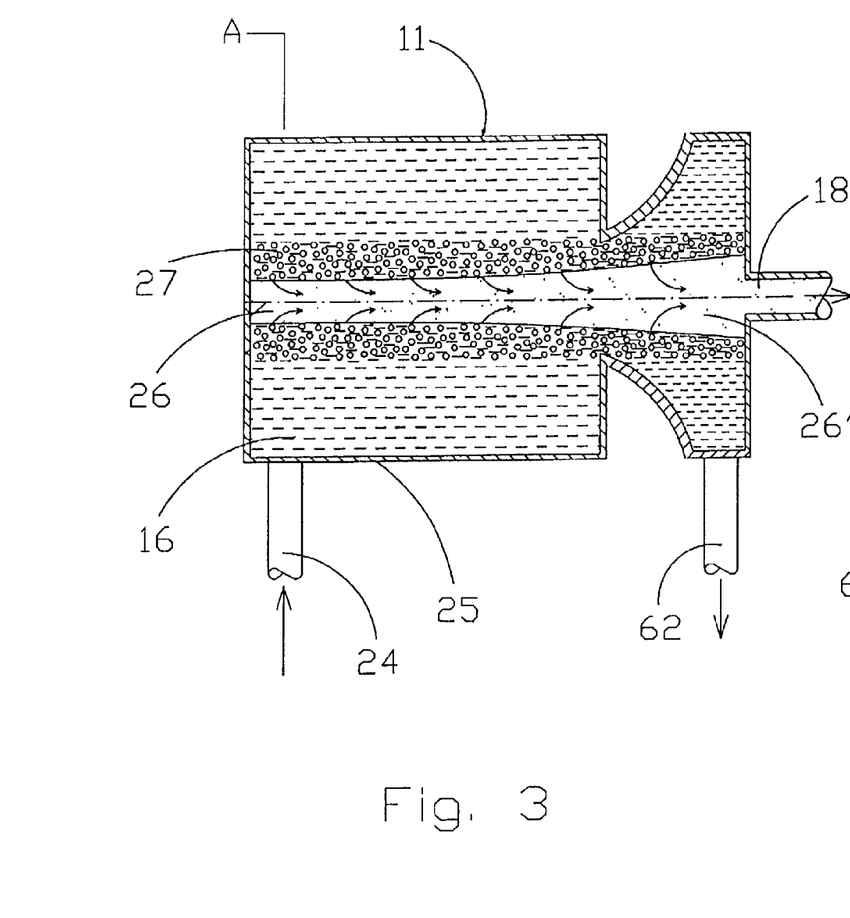
FIG. 3 is a cross-sectional view of a vortex vapor generator for extraction of certain fractions from initial liquid product.
Figure 3A:
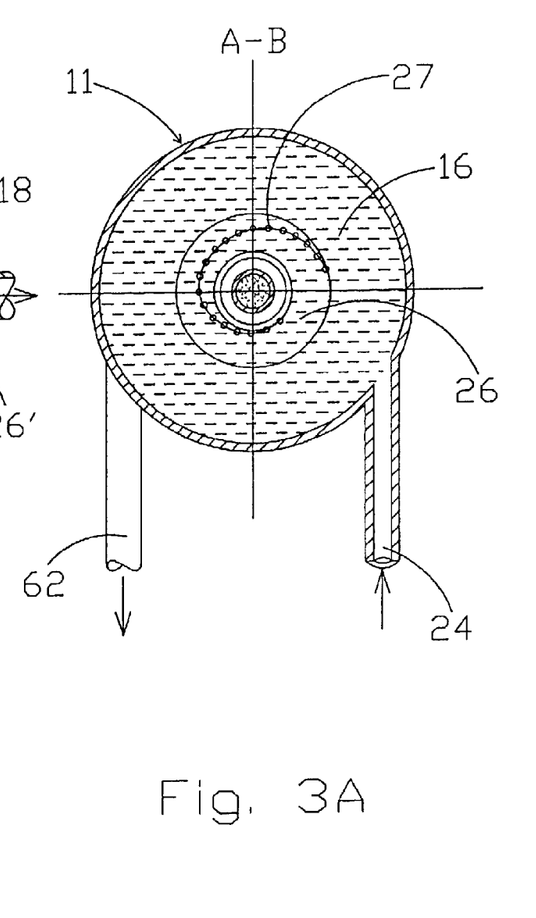
FIG. 3A is an end elevational view of the vortex vapor generator shown in FIG. 3.

The vortex vapor generator 11 cross-sectional view presented in FIG. 3 is similar to the vortex separator cross-sectional view shown in FIG. 2. A difference is the absence of a chamber for a collection of water separated from oil and the absence of openings for water extraction; also oil is heated to temperatures close to a boiling point of one of fractions. The main features of the vortex vapor generator are determined by processes of volumetric boiling in heated liquid oil, and its heavy remains in consecutive stages of separation for fractions.

Oil 16 is heated in the furnace 10 or the heat exchanger 9 (both shown in FIG. 1), at elevated pressure, exceeding a pressure of saturated vapor of most light fraction at given temperature of liquid, which is lower than its boiling point, and applied through a tangential opening 24 into the vortex vapor generator chamber 11 with a thermal insulation 25. As it was above pointed out, in correspondence with the law of momentum conservation of motion, an azimuthal component of speed increases with a decrease of a radius, and pressure drops. When temperature of oil fraction is close to a boiling point, a pressure decrease with a temperature preservation of rotating liquid leads to a condition that at a certain definite radius, there is a pressure equality in liquid and a pressure of light fraction's dry saturated vapor expressed by the Clapeyron-Clausius equation.

This condition determines a volumetric boiling of liquid with development of microbubbles 27 floating to a central axis of the vortex chamber 11 under a pressure gradient influence. It is well known that microbubbles originated on a heated surface, or in a volume of heated liquid, are small and measured by a few microns. At such dimensions a liquid droplet phase inside of bubbles is absent. With bubbles floating into a region of reduced pressure, their dimensions grow. A gas mass inside of a bubble grows simultaneously due to evaporation from a surface of surrounding liquid. A bubble up floating speed in the field of the centrifugal forces and developed by their pressure gradient, in comparison with evaporation in the gravitation field, theoretically increases as much as the centripetal acceleration exceeds the gravity acceleration. However, as it was noted in experiments, an influence of liquid's viscosity and increase of friction forces with a growth of bubble speed and their dimensions leads to a decrease of bubbles up floating speed to 5–10 m/s depending on a viscosity of a medium.

A low pressure near the vortex vapor chamber axis helps to develop a gas vortex 26 filled with a vapor of light fraction. The axial speed of vapors increases to exit 18 from the vortex chamber due to the increase of mass of vapors brought by up floating bubbles. As it was described above, depending on a ratio of pressures in gas vortex 26' and in a medium where a developed vapor flows out into a vortex vapor condenser 12 (shown in FIG. 1 and FIG. 4) where condensation takes place, a subsonic or a critical, sonic regime of flow is established at the vortex vapor generator exit 18.

As a rule, because a pressure difference between a region of vapor out-flow and a region of condensation exceeds the critical pressure, the critical flow regime is realized.

Heavier, not evaporated, residue is transferred from a vortex chamber through a pipeline 62.

During out-flow of vapor bubbles from a liquid the disturbances on its surface can appear. The amplitude of these disturbances increases due to aerodynamic interaction with a vapor flow moving along a liquid surface. This phenomenon expands a fraction composition of a finite product due to a removal of a droplet phase torn away by a vapor flow from a capillary ridge of wave. This effect decreases in further stages of separation for fractions, because the viscosity of liquid in them is higher.

Vortex Vapor Condenser for Products of Oil Separation and its Features

Figure 4:
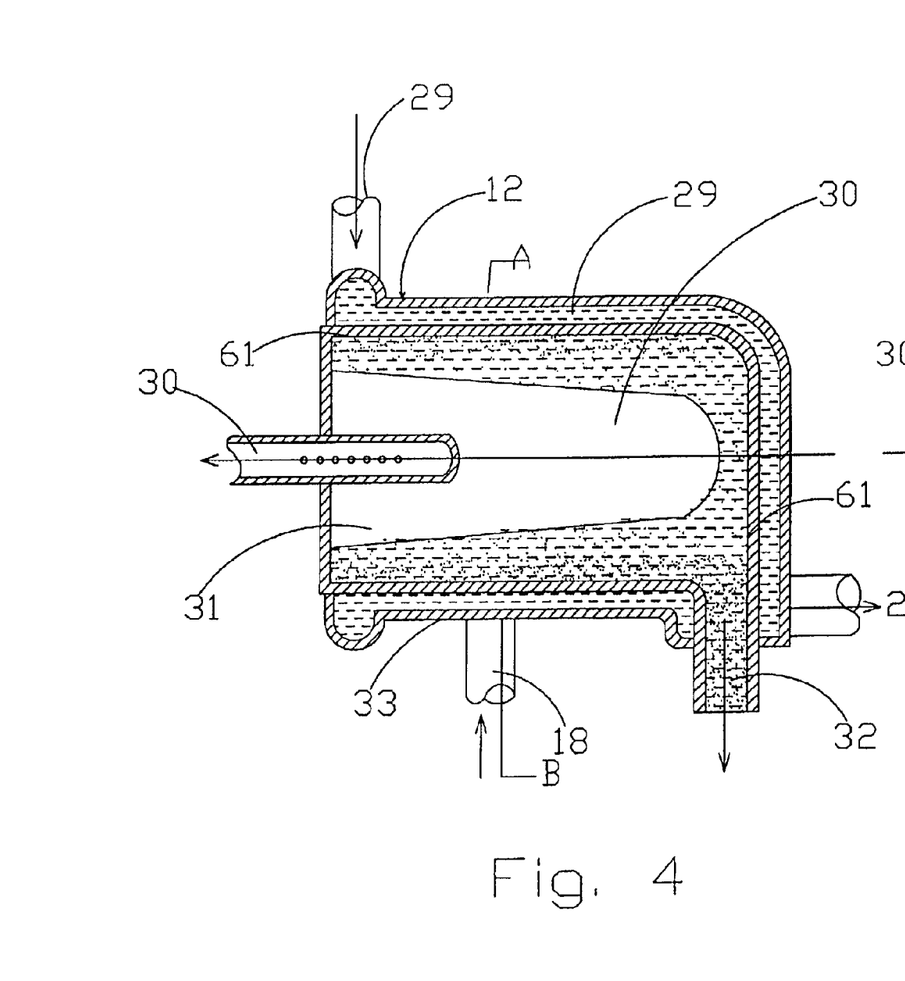
FIG. 4 is a cross-sectional view of a vortex vapor condenser for separated fractions.
Figure 4A:
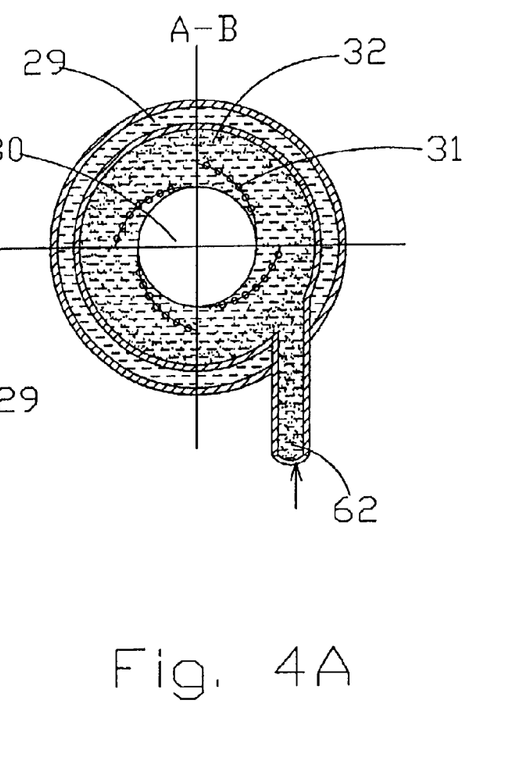
FIG. 4A is an end elevational view of the vortex vapor condenser shown in FIG. 4.

The vortex vapor condenser 12 is connected with the vortex vapor generator 11, as shown in FIG. 1, through a pipeline 18 from where vapors are introduced along a tangent line to an internal cylindrical surface of the condensation chamber as shown in FIG. 4.

An external wall of a condensation chamber 33 is cooled by water or coolant 29 with a lowest possible temperature. An expansion of vapors coming from the vortex vapor generator into the condensation chamber 33 and removal of arrived vapor mass due to condensation on a cooled surface helps creation of a liquid phase both on cooled walls 61 and in vapor flow 31, caused by throttling effect. A droplet phase developed in vapor 31 moves to the chamber walls under the influence of centrifugal forces. A liquid phase condensed on walls 61, and kept on walls by centrifugal forces, flows down to a bottom of the condensation chamber 33 and transported through a pipeline 32 by a pump (not shown in FIG. 4) into a corresponding reservoir 13 (shown in FIG. 1). Uncondensed vapors 30 of most light fractions are removed through a central opening into a second stage of condensation into a compressor 5' (shown in FIG. 1).

During a condensation process of vapor flow an appearance of high-frequency acoustic oscillations and low-frequency pressure oscillations due to a change of a liquid layer thickness on the condenser wall and a temperature change on a liquid surface takes place. As it was above mentioned, a realization of critical vapor flow regime eliminates influence of these oscillations on the process of oil separation in the vapor generator.

Catalytic Reactor with Boiling Layer in Rotating Liquid

The effect of a stable position of solid particles in a rotating liquid permits organization of the process of oil catalytic cracking by the combining of a boiling layer with a catalyst layer, which provides a maximum efficiency of catalytic processes. The dimensions of a catalytic reactor are similar to a vortex separator and a vortex vapor generator with a radius from about 0.1 m to about 1 m, with optimum radius equal to 0.5 m, and with a length from about 0.2 m to about 2 m, with optimum length equal to 1 m. A liquid's pressures applied to these devices are from about 1.5 atm to about 20 atm, with optimum pressures from 6 atm to 12 atm.

Figure 5:
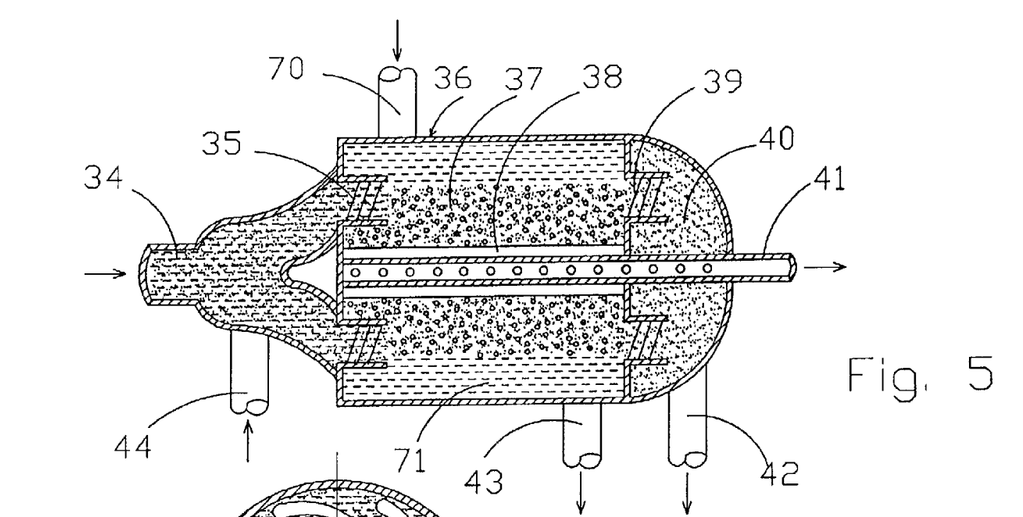
FIG. 5 is a cross-sectional view of a vortex vapor generator with the boiling catalytic layer, or a catalytic reactor.
Figure 5A:
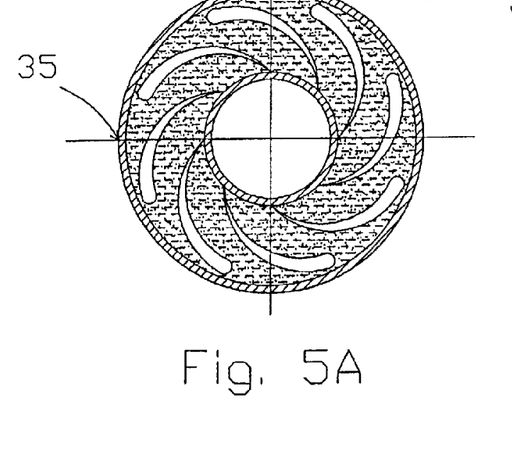
FIG. 5A is an end view of a swirling device attached to the vortex vapor generator with the boiling catalytic layer of FIG. 5.

A cross-sectional view of a vortex vapor generator with a catalyst, or a catalytic reactor with a boiling layer is given in FIG. 5.

This design of a catalytic reactor 36 with a boiling layer, or region 37, and a vortex 38 is similar to the design of the vortex vapor generator but distinguished from it with additional devices 35 and 39, which are necessary for a catalyst introduction and extraction.

Heavy products of oil thermal cracking together with water vapors are supplied into the catalytic vortex vapor generator together with the catalyst through a collector 34 and a pipe 44 (alternative introduction method of the catalyst and heavy oil with water vapors is through a tangential pipe 70) and acquire a circumferential speed passing through a swirler 35. The place for the swirler location in a vapor generator's chamber 36 is determined by the conditions for development of a boiling layer 37, i.e. by temperature, pressure and speed of incoming liquid which is a mixture of oil's heavy fractions and water vapors.

An extraction of the catalyst from the catalytic vortex vapor generator is carried out through a blade constrictor 39 with expanding passing cross sections in design similar to the swirler 35, helping to reduce a speed of vapor mixture and liquid and to increase a pressure in an output collector 40, from where admixture of oil fractions with the catalyst's solid particles is directed into the regenerator 54 (shown in FIG. 6) through a pipe 42.

Liquid remains, that didn't interact with a catalyst, are collected in a peripheral region 71 of the reactor and extracted from it through a pipe 43.

The cracking products are concentrated in the vapor vortex 38 and removed from it through a central tube 41 with holes in its walls. In order to prevent removal of the catalyst particles of small dimensions with a flow of light fractions, it is necessary that an external wall of the tube 41 will be covered with a metal grid, or screen. After separation of vapor fractions in the vortex vapor separator, liquid and catalyst particles are directed into the catalyst's regenerator 54 (shown in FIG. 6), from where the regenerated catalyst is returned into the catalytic reactor through the pipe 44.

A selection of the catalyst particles size and mass permits combining of the boiling layer with the catalyst layer moving in the region of vapor development 37.

A catalyst supply and extraction can be continuous, or periodical depending on necessity for a catalyst renewal, due to depletion, poisoning, or substitution for different catalyst.

As was above noted, a boundary of a liquid boiling beginning along the vortex vapor chamber radius is determined by the Clapeyron-Clausius equation and it is matched with a boundary of a catalyst's layer through a variation of a liquid's temperature, pressure at the chamber's entrance, and a liquid's exit speed. A basic parameter determining a boundary of a liquid's boiling is temperature.

The above given examples show that it is possible to organize a technological process of consecutive obtaining of light oil fractions from oil heavy residues in the thermocatalytic reactors with vortex vapor generation. The main advantage of such processes will be a fine separation of products of reactions for fractions at lower heating temperatures of initial heavy residues and a possibility for application of vacuum for obtaining necessary light fractions. The scheme of such technology with application of a consecutive chain of catalytic reactors with condensers of products of reactions is similar to the above suggested scheme for the separation of oil for fractions in the vortex vapor generator; each catalytic reactor is supplied with heavy oil residue of different temperature and necessary catalyst for a specific fraction or fractions release.

An alternative method of thermocatalytic processes is a heating of an oil residue to high temperature over about 500 C, and after the catalysis, the products in the form of a mixture of vapors of light and heavy fractions are removed from the thermocatalytic reactor through the central tube 41 into the vortex vapor condenser. In contrast with the thermal separation of oil for fractions by the vapor vortex generator, a condensation and extraction of condensed liquid begins with a heavy fraction, having most high temperature of condensation. Vapor pressure of lighter fractions helps for outcome of these fractions into the next condenser-separator. A condensation process of next lighter fraction is similar to a previous stage, and, at a sufficient pressure gradient between the first and second stage of separation, it is possible to not utilize additional compressor between them. In the case of insufficient pressure gradient, such a compressor compensates a hydraulic resistance and necessary pressure for providing a speed for vapors into further stages of separation. If it is necessary to have more narrow separation of a catalysis products for fractions, it is possible to increase a number of separation stages with a condensation of separate fractions.

In the design of multi-ton production of catalytic cracking products, the above described reactors can operate in parallel with one catalytic regenerator utilized in a refinery plant.

Scheme of Technological Process for Catalytic Cracking of Oil Products

Figure 6:
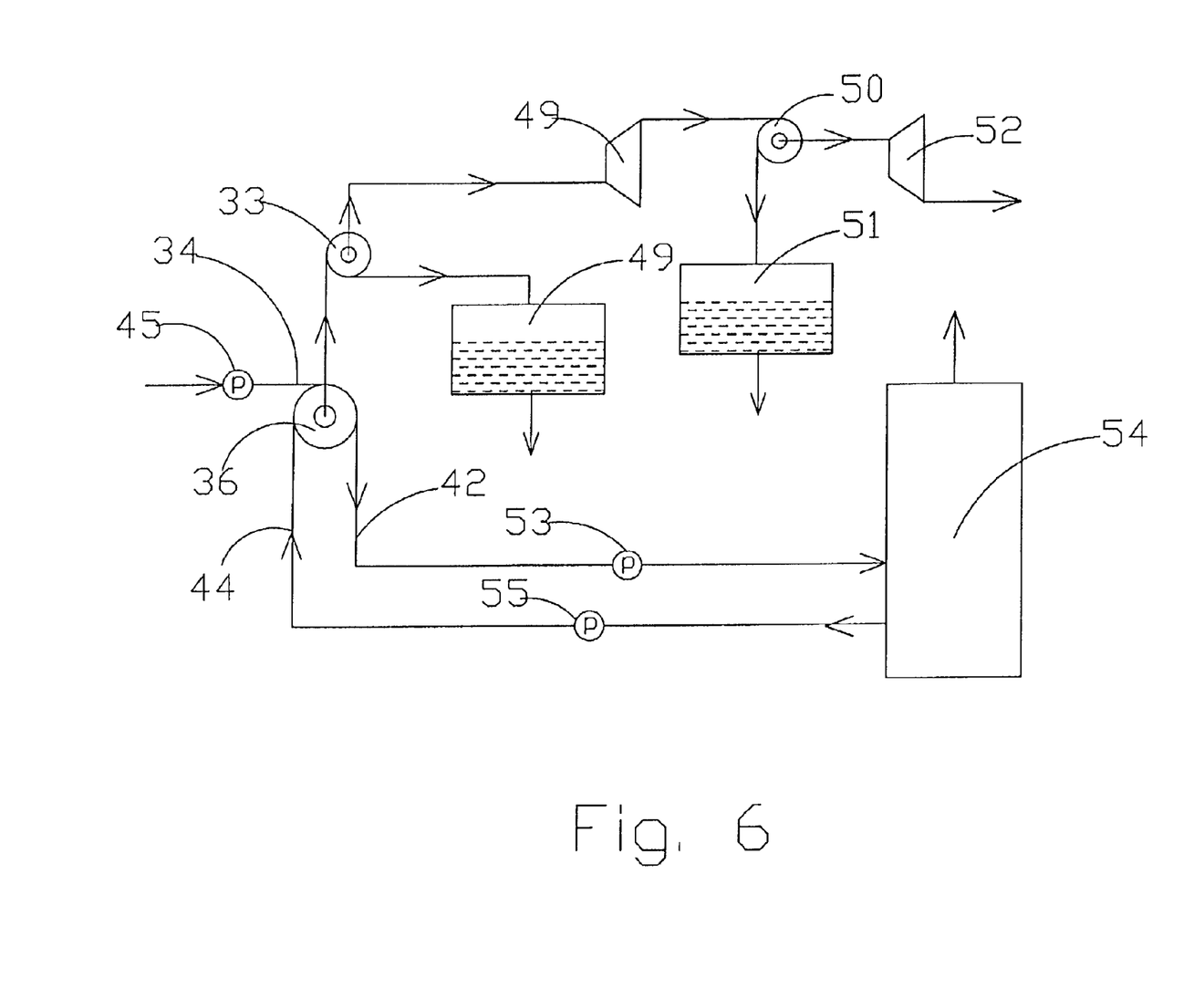
FIG. 6 is a schematic diagram of a unit providing the oil catalytic cracking process.

A sequence of processes in catalytic cracking of oil products is shown in FIG. 6.

The unit C includes a combination of devices providing the catalysis for narrow fractions as a logical continuation of the technological chain of thermal cracking processes shown in FIG. 1.

Oil heavy residues after thermal cracking are supplied by a pump 45 into the catalytic reactor 36 with a boiling layer for a catalytic cracking. Gas catalysis products consisting of light fractions mixture are supplied into the vortex vapor condenser 33' (with features similar, or corresponding to described in FIG. 4), where a fraction with low vapor pressure is condensed and transported into a reservoir 49. Remaining uncondensed lighter fractions are directed into a compressor 48 and into a second stage of condensation in a vortex vapor condenser 50, from where a condensed phase is transported into its reservoir 51. Most light fractions, which remain not condensed in the vortex vapor condenser 50, are supplied into a compressor 52 and into consecutive vortex vapor condensers. Thus, a fine separation of catalytic products for fractions of narrow composition is realized by unified devices, all utilizing the effect of inertia forces.

The catalyst operating in the boiling layer of the vortex vapor generator 36, together with the liquid's remains 42 (shown in FIG. 5), is supplied by a pump 53 into the catalyst regenerator 54, and after regeneration of its properties is returned by a pump 55 into the catalytic vortex vapor generator 36 with the boiling layer.

Two-Zone Combustion Furnace

Figure 7:
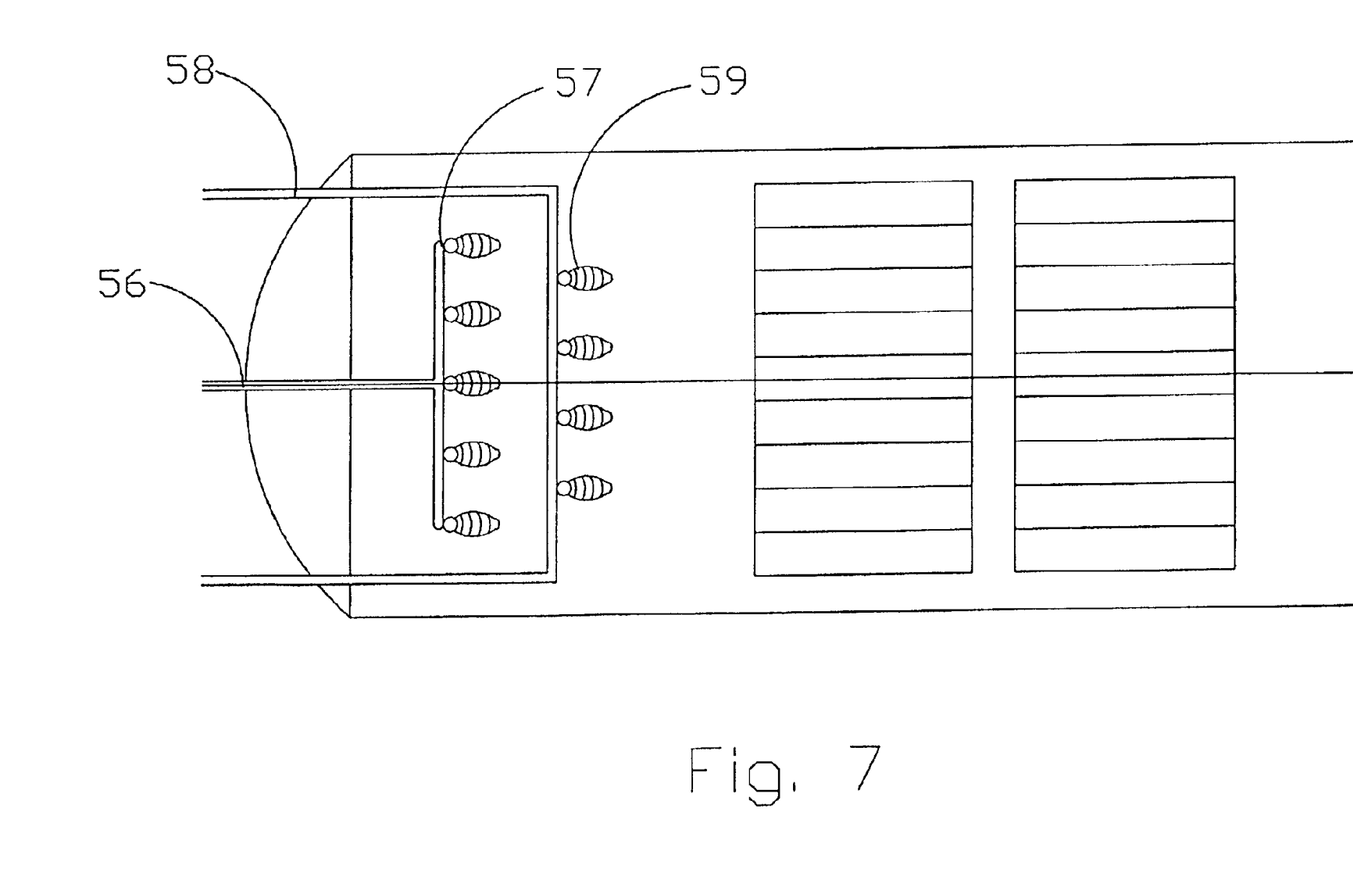
FIG. 7 is a schematic diagram for organization of two-zone combustion in a tubular furnace providing a heating of oil and its products in the process of thermal and catalytic cracking.

In order to decrease energy costs and to improve the ecology of oil refinery processes, it is necessary to reduce an ejection of combustion products from the heating furnaces and catalyst regenerators into the atmosphere. One of the ways for improvement of combustion completeness is providing a two-zone combustion, which is shown in FIG. 7. Satellite gases of oil purification or light fractions of distillation are supplied through a pipe 56 into a first band of burners 57 and develop a first zone of combustion with high temperature, into which heavy components, such as fuel oil through a pipe 58, are introduced into a second band of burners 59. This helps decreasing time for preparation of heavy components for combustion, dimensions of combustion zone and increasing a combustion completeness with decrease of solid particles output in outgoing gases.

Such combination of technological processes described in this invention gives significant advantages, which provide:

A deep oil rectification with fine separation for fractions, which permits obtaining high quality products;

A significant increase in a productivity of oil refining complexes with a reduction of metal content and cost;

An increase of repair capabilities due to easy substitution of separate units and elements;

A very reliable safety, due to oil low processed volumes and low pressures;

A possibility for automatic control of processes taking place in vortex devices for multiple steps in the oil refining processes;

A possibility for development of more compact oil refining plants with their location in places less vulnerable for modern means of destruction.

The various devices and arrangement described above can find application in fields of utilization different from crude oil refining:

(a) Devices for seawater desalination;

(b) Systems for separation of mixtures of any liquids with different boiling points for narrow composition of fractions;

(c) A purification of a first loop of nuclear reactors of on ground nuclear power stations from gas radioactive isotopes (J, Xe) and heavy residuals from nuclear fusion;

(d) A purification of used oil with the partial restoration of its properties;

(e) In the blood purification process, because the vortex separators have no rotating parts, a liquid rotates under its own applied pressure;

(f) In the oil-chemical industry, where processes requiring a separation of liquid-vapor phases and the separation of narrow fractions are realized;

(g) In the pharmaceutical industry for a purification of chemical compositions and extraction of fine components with utilization of vacuum systems without heating of a liquid; and (h) In the waste water treatment systems for separation of different liquids and gases.

What is claimed is:

1. An oil refining system of thermal processes for fine fractions in the field of inertia forces with utilization of vortex separators, vortex vapor generators, and vortex vapor condensers for separation of liquids with different densities and/or different boiling temperatures, which permits obtaining fine uniform oil products by both thermal distillation and cracking at significant simplification of construction elements of said system comprising:

(a) a unit of preliminary oil purification from admixtures, water and satellite gases contained in crude oil; said unit of preliminary oil purification including:

a reservoir, or pipeline with crude oil; a pump for crude oil supply into a vortex separator for separation of oil from water and other admixtures;

a coarse filter for purification from mechanical admixtures;

a heat exchanger for preliminary heating of crude oil with a purpose of reducing viscosity of said crude oil;

a vortex separator for separation of oil from satellite gases, water and dissolved in said crude oil salts;

pumps for oil supply to consecutive units for its separation for fractions and water removal into extraction systems for recovery of useful products; for enhancing of a crude oil purification a separate process can be performed in two vortex separators in series;

(b) a second unit assigned for deep oil separation for fractions consisting of consecutive stages of heating, evaporation of initial oil and residual products of thermal separation including: intermediate furnaces, or heat exchangers for heating of initial product to temperatures corresponding to release of fraction of given composition (close to a boiling point of a particular fraction); vortex vapor generators providing intensive process of evaporation in volume of rotating liquid;

a pump utilized for extraction of evaporation products into condensers and transfer of not evaporated liquid into a consecutive stage of fraction evaporation; a vortex vapor condenser for gas products of oil distillation with corresponding cooling system of its construction elements;

a condensation heat can be utilized for preliminary heating of crude oil, or for intermediate stages of oil separation for fractions;

liquid products from vortex vapor condensers of separate stages are supplied by a pump into corresponding reservoirs.

2. An oil refinery system of catalytic cracking processes in said system for heavy products of previous oil distillation for fine fractions comprising:

(a) a tubular furnace for heating of initial product up to temperatures corresponding to heavy fractions boiling in the range of 300–500 C; and for obtaining of more narrow fractional composition of catalytic products, a furnace for providing a heating of initial product to the temperatures in a sufficiently narrow range distinguished by intensity of heat exchange inside a furnace; and, in this case, a necessity for utilization of several furnaces for successive heating of initial components is eliminated;

(b) a vortex vapor generator with a catalyst layer moving in a boiling layer of a liquid;

(c) a system of a catalyst introduction and extraction into and from a boiling layer of a vortex vapor generator, i.e. a catalyst circulation system;

(d) a catalyst regeneration system, which can consist of already existing equipment;

(e) a vortex vapor condensers of catalyst products and pumps transporting condensate into corresponding reservoirs.

3. A vortex separator utilizing inertia forces of rotating liquid for separation of not purified crude oil from water and other heavy admixtures comprising:

(a) a tangential introduction of crude oil into cylindrical chamber of a vortex separator;

(b) a collector of purified oil;

(c) a chamber for water collection connected with a separator's cylindrical chamber through holes;

(d) a tube for extraction of gases in a backside of vortex separator through a tube, which diameter is less than a gas vortex diameter;

(e) a tangential tube for extraction of purified oil;

(f) a tube for water extraction; and (g) a separation efficiency of oil from water can be enhanced by repeating of a process in another vortex separator.

4. A vortex vapor separator utilizing inertia forces of rotating liquid for increase of oil vapor intensity output due to increase of up floating bubbles developed in a vortex vapor generator volume in a field of accelerating forces comprising:

(a) a tangential introduction of oil purified from water and preliminary heated in a furnace, or a heat exchanger at elevated pressure exceeding a saturated vapor pressure of oil most light fraction at given temperature;

(b) in a vortex vapor generator volume with increase of a radius a pressure of a liquid falls down, and at preservation of rotating liquid temperature it leads to a situation, when at a certain definite radius the condition of equality of pressure in a liquid and pressure of a dry saturated vapor of a light fraction is realized, and this condition determines a volumetric boiling in liquid with development of microbubbles filled with vapors of light fraction, up floating to a chamber axis under influence of pressure gradient;

(c) a tube for extraction of gases developed in a result of up floating bubbles; and at said tube a subsonic, or critical (sonic) regime of light fractions vapor flow is established; a critical flow regime from the vortex vapor generator provides a way for prevention a propagation of disturbances, or oscillations into the vortex vapor generator during condensation of vapors in a vortex vapor condenser;

(d) by reducing pressure at a vortex vapor generator exit, it is possible to change conditions for boiling in a vortex of the vortex vapor generator, so that pressure in a vortex can be varied; in this case, it is possible to separate fractions with boiling points which are close at pressure 1 atm, and different at-lower pressure.

5. A vortex vapor condenser or oil refinery products utilizing inertia forces of rotating liquid for a condensation of oil's different fractions comprising:

(a) a tangential introduction of a vaporized fraction coming from a vortex vapor generator, where said apparatus external wall is cooled by water or coolant with possible low temperature, where a vapor expansion supplied by a said above vortex vapor generator into a vapor condenser's chamber and removal of coming vapor mass due to condensation on a cooled surface promotes a development of a liquid phase, both on cooled walls, and in a vapor flow (due to throttling effect), where a droplet phase, which is developed in vapor, moves to a chamber's wall under the influence of centrifugal forces, where a liquid phase, which is condensed on a wall, is maintained there by said forces, and said liquid phase flows into a condensation chamber's bottom and directed by a pump into a corresponding reservoir for collection of a specific fraction;

(b) a central hole, through which non-condensed vapors of lightest fraction are directed into next stage of condensation of a similar apparatus, or a compressor.

6. A catalytic reactor utilizing inertia forces with catalyst in a boiling layer in a rotating liquid comprising:
   (a) a vortex vapor generator chamber with catalyst and supplied liquid (oil heavy residue) where a catalytic reaction takes place;
   (b) a collector, through which heavy products of oil thermal cracking and a catalyst are supplied; an alternative way for supply of heavy products and catalyst is through a tangential introduction into a vortex vapor generator chamber;
   (c) a swirler, where said products and a catalyst acquire a circumferential speed, and catalysts particles occupy a certain layer in a chamber according to supplied liquid speed, pressure, temperature, and catalysts mass and area;
   (d) a vortex vapor generator's chamber with a catalyst, where a swirler location is determined by conditions for development of a boiling layer, i.e. by temperature, pressure and speed of supplied liquid;
   (e) a blade constrictor for extraction of a catalyst from vortex catalytic vapor for decrease of a vapor and liquid mixture speed and for increase of pressure in an output collector, from where a mixture of oil fractions with solid particles is directed into a catalytic regenerator through an output tube;
   (f) a tube for returning a regenerated catalyst from a catalyst regenerator;
   (g) a tube through which liquid residuals of catalytic cracking collected in a peripheral area of catalytic reactor are extracted;
   (h) a central tube with holes in its walls, through which light fractions of cracking products concentrated in a gas vortex are removed;
   (i) a metal grid of an output tube external wall serving for prevention of small size catalyst particles removal with flow of light fractions.

7. A two-zone combustion furnace for reducing energy spending and improvement of ecology of oil refining processes, and permitting improvement of combustion of oil heavy fractions for a combustion completeness with a decrease of solid particles output in outgoing gases comprising:
   (a) a first band of burners of light gases developing a first combustion zone with high temperature;
   (b) a second band of burners of heavy residue and gases providing additional combustion of unburned gases and solid particles.

8. An oil refinery system for separating crude oil from a mixture of said crude oil and water and dissolved heavy admixtures, and then separating said oil into fractions of different boiling points, said system comprising:
   (a) a supply of said mixture of oil, water, and heavy admixtures;
   (b) first vortex separator means for separating said oil from said water and said heavy admixtures, wherein said vortex separator means comprises a cylindrical chamber with a tangentially located inlet port for receiving said mixture under pressure;
   (c) first collector means for collecting a purified oil which is separated from said water in said vortex separator means;
   (d) second collector means for collecting said water after it has been separated from said crude oil in said vortex separator means;
   (e) heating means for heating said crude oil to an elevated temperature to reduce the viscosity of said crude oil;
   (f) vortex vapor generator means for separating said purified oil into fractions of different boiling points; wherein said vortex vapor generator means comprises a cylindrical chamber including a tangentially located inlet port for receiving said oil under pressure;
   (g) first collector means for collecting fractions of said oil having a boiling point below said elevated temperature; and
   (h) second collector means for fractions of said oil having a boiling point above said elevated temperature.

9. An oil refinery system for catalytically cracking heavy fractions of oil into light fractions, said system comprising:
   (a) heating means for heating said heavy residues of oil to an elevated temperature; said heavy residues are heated at lower heating temperatures with a vaporization taking place in a boiling layer with a catalyst (catalytic reactor); where obtained light fractions are separated, and remained heavier residues heated to higher temperature and sent into a next consecutive reactor, or a chain of reactors;
   (b) vortex vapor generator means comprising a cylindrical chamber with a tangentially located inlet port, or a collector with a swirler for receiving said heavy fractions of oil under pressure; wherein said vortex vapor generator means includes a particulate catalyst; and
   (c) vortex vapor condenser means for receiving said light fractions from said vortex vapor generator means and condensing said lighter fractions.

* * * * *